July 7, 1970 MORIO ONOE ET AL 3,519,960

ELECTROMECHANICAL FREQUENCY BAND SEPARATION APPARATUS

Filed Dec. 23, 1968

INVENTORS
Morio Onoe
Takeshi Yano

BY

Mann & Jangarathis
ATTORNEYS

United States Patent Office 3,519,960
Patented July 7, 1970

3,519,960
ELECTROMECHANICAL FREQUENCY BAND SEPARATION APPARATUS

Morio Onoe and Takeshi Yano, Tokyo, Japan, assignors to Nippon Electric Company, Limited, Tokyo, Japan
Filed Dec. 23, 1968, Ser. No. 786,172
Claims priority, application Japan, Dec. 28, 1967, 43/84,479
Int. Cl. H03h 7/02, 9/26
U.S. Cl. 333—6 14 Claims

ABSTRACT OF THE DISCLOSURE

Electromechanical frequency band separation apparatus is provided wherein the multimode vibrations of main electromechanical transducer means are utilized in conjunction with a plurality of frequency selective, mechanical branches to form a frequency division network. The multifurcated structure of the electromechanical frequency band separation apparatus thus formed provides relatively wide spacing between the passbands of the plurality of frequency selective, mechanical branches present therein, whereby the characteristics of the network formed are similar to that of purely electrical frequency band separation apparatus.

Figure 1:
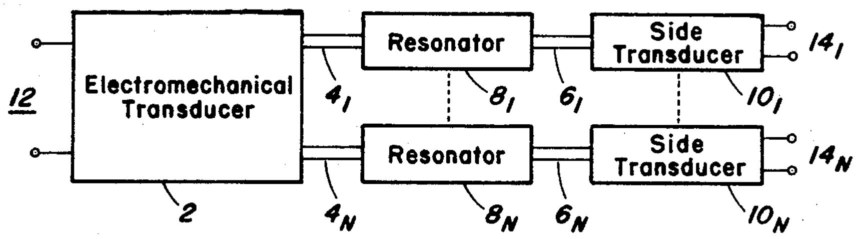

This invention relates to frequency band separation apparatus and more particularly to improved electromechanical frequency band separation apparatus which includes main electromechanical transducer means capable of excitation in a plurality of modes of vibration.

Heretofore, purely electrical frequency band separation apparatus has played a major role in communication systems such as carrier telephony system. Such purely electrical frequency band separation apparatus normally comprises various combinations of inductors and capacitors in frequency selective combinations which act upon electrical input signals applied thereto to separate such signals into a plurality of output signals of differing frequency components which output signals have a predetermined frequency spacing therebetween. The present invention is drawn to mechanical structures which perform the equivalent circuit function to such purely electrical frequency band separation apparatus by relying upon electromechanical transducing means and mechanical resonating means.

Electromechanical frequency band separation apparatus is known to those of ordinary skill in the art wherein a plurality of main transducer means are electrically connected in parallel with an electrical input signal source to provide for the separation of electrical input signals applied to such plurality of main transducer means according to frequency. However, as electromechanical frequency band separation apparatus containing a plurality of main transducer means has proven excessive in size and weight, and expensive in manufacture, due principally to the presence of such plurality of main transducer means, such apparatus has not provided an attractive alternative to the purely electrical forms of such apparatus as described above.

In a paper entitled "Electromechanical Wave Separating Filters," published by the Institute of Electronics and Communications Engineers, under reference No. CTST67–5, May 1967; the inventors of the subject matter contained herein proposed a new form of electromechanical frequency band separation apparatus having a multifurcated structure and using a single main transducer means vibrates in a single vibration mode. In this paper, it was verified that a multifurcated structure using a single main transducer means which vibrates in a single vibration mode may be coupled to two or more coupled resonator means designed for frequency band separation. In addition, the referenced paper has made it clear that in such electromechanical frequency band separation apparatus, the mechanical coupling coefficient between the main transducer means and each resonator means coupled thereto increases with an increase in the interpassband spacing and further, if such electromechanical frequency band separation apparatus is to be physically realized, the specific frequency band spacing, which is defined as the mean value of the ratios of adjacent passband spacings to the center frequency of the output frequency range, for bifurcated, quadrifurcated and octafurcated network apparatus must be made less than seven (7), five (5) and four (4) percent, respectively. Accordingly, it will be seen that the electromechanical frequency band separation apparatus relying upon a single main transducer means which vibrates in a single vibration mode, as proposed by the referenced publication, leads to rather narrow passband separation which is maximized at seven (7) percent in the case of bifurcated apparatus whereby the mechanical band separation or adjacent channels in terms of resonance frequency ratio is1.07:1.

Therefore, it is an object of this invention to provide improved electromechanical frequency band separation apparatus, including only a single main transducer means therein, having a relatively wide passband separation between adjacent channels.

It is a further object of this invention to provide electromechanical frequency band apparatus which functions as a linear, bilateral network capable of frequency band separation or combination.

It is an additional object of this invention to provide improved electromechanical frequency band separation apparatus which is compact in structure and readily admits of combination in present-day communication systems.

Other objects and advantages of the invention will become clear from the following detailed description of several embodiments thereof, and the novel features will be particularly pointed out in connection with the appended claims.

Figure 2A:
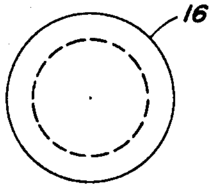
Figure 2B:
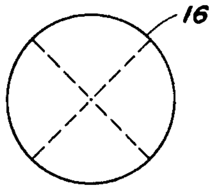
Figure 3:
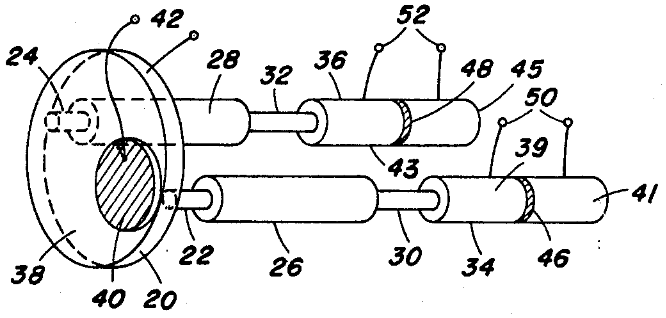

In accordance with this invention, electromechanical frequency band separation apparatus including main electromechanical transducer means which is capable of excitation in a plurality of modes of vibration, and a plurality of mechanical resonating means are combined in a manner such that the respective frequencies of said plurality of modes of vibration are coupled respectively to said plurality of mechanical resonating means whereby the resonance frequency ratios of said plurality of modes of vibration are substantially equal to the ratios of the passband separation defined by the output branches of such electromechanical frequency band separation apparatus. The invention will be more clearly understood by reference to the following detailed description of several embodiments thereof in conjunction with the accompanying drawings in which:

FIG. 1 is a block diagram schematically indicating a general embodiment of the electromechanical frequency band separation apparatus in accordance with the teachings of the present invention;

FIGS. 2*a* and 2*b* are schematic representations of a circular disc resonator means vibrating in two different modes to illustrate an exemplary case of multimode vibration, wherein FIGS. 2*a* and 2*b* depict the lowest degree axisymmetric and non-axisymmetric flexural vibrations of a circular disc, respectively; and FIG. 3 is a pictorial view of an embodiment of electromechanical frequency band separation apparatus according to the present invention.

Referring now to the drawings and more particularly to FIG. 1 thereof, there is shown in block form a schematic diagram indicating a general embodiment of the electromechanical frequency band separation apparatus in accordance with the teachings of the present invention. As shown in FIG. 1, the depicted general embodiment of the electromechanical frequency band separation apparatus comprises main electromechanical transducer means 2 which is capable of vibrating in a plurality of modes, a plurality of first and second coupling means $4_1$–$4_N$ and $6_1$–$6_N$, respectively, a plurality of resonator means $8_1$–$8_N$ and a plurality of side transducer means $10_1$–$10_N$. A pair of input electrodes 12 are affixed to the main electromechanical transducer means 2 at the electrical input portion thereof and the plurality of first coupling means $4_1$–$4_N$ are connected to the output portion of said electromechanical transducer means 2. As the specific structure of a typical embodiment of this invention will be described in detail in conjunction with the exemplary embodiment of this invention depicted in FIG. 3, for the purposes of the description of the general embodiment of FIG. 1, the main electromechanical transducer means 2 may be considered to be any form of transducer means, which will, upon the application of electrical signals thereto, transduce such electrical signals into mechanical forces which will cause the output portion thereof to vibrate in a plurality of modes. Thus, if it is assumed that the output portion of the electromechanical transducer means 2, upon the requisite excitation, exhibits M modes of vibration, each of such M modes of vibration, multiples of each of said M modes of vibration or combinations thereof may be relied upon to establish various passband of the mechanical, frequency selective branches connected thereto. Accordingly, the plurality of first coupling means $4_1$–$4_N$ connected to the output portion of said main electromechanical transducer means 2 are each connected to the input portions of one of said resonator means $8_1$–$8_N$, respectively, whereby the vibrations of the output portion of said main electromechanical transducer means 2, in each of the M modes of vibration, are capable of being coupled to each of said resonator means $8_1$–$8_N$. Each of said resonator means $8_1$–$8_N$ are designed, however, in the well-known manner, to resonate at approximately the frequency of one of the selected M modes of vibration whereby only the vibrations of the selected mode of vibration, or a multiple thereof, at which the resonant frequency of a given resonator means $8_1$–$8_N$ resonates, will be effectively coupled to that resonator means to establish the vibration thereof at said resonant frequency. The resonator means $8_1$–$8_N$ are each coupled, through respective ones of the second coupling means $6_1$–$6_N$, to one of said plurality of side transducer means $10_1$–$10_N$, respectively, so that the resonant vibrations of each of said resonator means $8_1$–$8_N$ are transmitted to one of said side transducer means $10_1$–$10_N$. The side transducer means $10_1$–$10_N$ are each provided with a pair of electrical output terminals $14_1$–$14_N$, respectively, so that each of said side transducer means $10_1$–$10_N$ may respond in the well-known manner to the resonant vibrations of the resonator means $8_1$–$8_N$ supplied respectively thereto to transduce such resonant vibrations into representative electrical signals and present such representative electrical signals at the appropriate pair of output terminals $14_1$–$14_N$. Thus, it is seen that the electromechanical transducer means 2 of the general embodiment of the electromechanical frequency band separation apparatus depicted in FIG. 1 is provided with a plurality of frequency selective mechanical branches which are responsive to selected ones of the various modes of vibration, or multiples thereof, of said electromechanical transducer means 2 and terminate respectively in electrical output terminals.

In operation of the general embodiment of the electromechanical frequency band separation apparatus according to the present invention, as depicted in FIG. 1, electrical input signals having a relatively wide frequency range are applied to the pair of input electrodes 12 affixed to the main electro-mechanical transducer means 2 at the electrical input portion thereof. The electrical input signals applied to the pair of input electrodes 12 are transduced, in the well-known manner, into mechanical forces which will cause the output portion of said electrical transducer means 2 to vibrate in a plurality of modes of vibration, each of said plurality of modes of vibration are applied to each of the frequency selective, mechanical branches over respective ones of said plurality of first coupling means $4_1$–$4_N$ connected thereto whereupon the respective resonator means $8_1$–$8_N$ present in that branch will vibrate at its resonant frequency which is approximately equal to one of said modes of vibration or a multiple thereof. Thus, it will be seen that the frequency components present in the electrical input signals applied to input electrodes 12 are effectively separated among the plurality of frequency selective mechanical branches in a manner determined by the multimode vibrations of the output portion of the electromechanical transducer means 2 and the resonant frequency of vibration or the passband of the resonator means $8_1$–$8_N$ which is present respectively in said frequency selective mechanical branches. The resonant vibrations of each of said resonator means $8_1$–$8_N$ are transmitted via the respective ones of said plurality of second coupling means $6_1$–$6_N$ to the side transducer means $10_1$–$10_N$, respectively. The side transducer means $10_1$–$10_N$ act, in the well-known manner, to transduce the vibrations transmitted thereto over the coupling means $6_1$–$6_N$ into electrical signals representative of such vibrations whereupon such representative electrical signals are available at the pairs of output terminals $14_1$–$14_N$, respectively connected thereto. Thus, the frequency components present in the electrical input signals applied to input electrodes 12, as separated among the plurality of frequency selective mechanical branches in the manner determined by the multimode vibrations of the output portion of the electromechanical transducer means 2 and the passbands of the resonator means $8_1$–$8_N$, are made available in the form of electrical signals of requisite frequency at the output terminals $14_1$–$14_N$ of the side transducer means $10_1$–$10_N$, respectively. Accordingly, it will be seen that the general embodiment of the electromechanical frequency band separation apparatus depicted in FIG. 1 takes the form of a multifurcated structure wherein an electromechanical transducer means exhibits a plurality of modes of vibration and one or more frequency selective branches, in the form of a mechanical circuit, may be provided for each such mode of vibration to thus accomplish the desired frequency separation.

FIGS. 2*a* and 2*b* are schematic representations of an exemplary circular disc resonator means 16 which vibrates in two modes of vibration. The exemplary circular disc resonator means 16 depicted in FIGS. 2*a* and 2*b* is designed in the well-known manner to resonate in the lowest degree axisymmetric, as shown in FIG. 2*a*, and non-axisymmetric, as shown in FIG. 2*b*, flexural modes of vibration and accordingly illustrates one of the simplest forms of multimode vibration. The axisymmetric and non-axisymmetric flexural modes of vibration shown in FIGS. 2*a* and 2*b*, respectively, are commonly referred to as the single circle and the two-diameter modes of vibration, respectively, and are known to have a resonance frequency ratio which is approximately 1.6 to 1. Therefore, as the resonance frequency ratio of the two flexural modes of vibration of the circular disc resonator means 16 illustrated in FIGS. 2*a* and 2*b* is approximately 1.6 to 1, as compared to a value of 1.07 to 1 for the single mode of vibration of the apparatus described in the referenced article, it will readily be appreciated that wider passband separation will be available where multimode vibration as distinguished from single mode vibration is used. Furthermore, when the higher degree vibration modes of resonator means are relied upon for multimode vibration, rather than the lowest degree vibration modes as illustrated in FIGS. 2*a* and 2*b*, the availability of even wider passband separation than that suggested above will be manifest. Accordingly, if multimode vibrations are relied upon in a multifurcated structure of the variety generally indicated in FIG. 1, it will be seen that an electrical input signal having a wide band, continuous frequency spectrum may be separated into a plurality of channels having much wider separation therebetween than would be available if only single mode vibrations of the kind referred to in the referenced article were relied upon.

Referring now to FIG. 3 there is shown an exemplary embodiment of electromechanical frequency band separation apparatus according to the present invention. In order to simplify the explanatory matter required by the specifically disclosed embodiment of this invention, as depicted in FIG. 3, and hence maintain the clarity of the instant specification, the exemplary embodiment of this invention illustrated in FIG. 3 takes the form of a bifurcated structure which relies upon the two lowest degree modes of vibration of a disc resonator means of the kind illustrated in FIGS. 2*a* and 2*b*. However, as will be obvious to those of ordinary skill in the art, upon an inspection of the specifically described embodiment of FIG. 3 as well as the general embodiment previously described with regard to FIG. 1, any form of resonator means exhibiting multimode vibrations may be utilized with any multifurcated structural configuration without deviating from the concepts of the present invention.

The embodiment of the electromechanical frequency band separation apparatus, in accordance with the teachings of the instant invention, as shown in FIG. 3, comprises a bifurcated structure including main electromechanical transducer means 20 which is capable of vibrating in two modes, a plurality of first coupling means 22 and 24, a plurality of resonator means 26 and 28, a plurality of second coupling means 30 and 32, and a plurality of side transducer means 34 and 36. The main electromechanical transducer means 20 may comprise a circular disc resonator means 38, formed of a suitable material such as an iron nickel alloy, and a transducer means 40, which may take form of a ferroelectric ceramic disc that is polarized in the thickness direction. The circular disc resonator means 38 is designed to have the two lowest degrees of flexural vibration modes, as mentioned above with regard to FIG. 2, and, although said circular disc resonator means 38 has been described as being formed of an iron nickel alloy, it should be noted that other suitable alloys or metals having a high temperature stability and a high mechanical Q may be readily substituted therefor. The transducer means 40 is provided with a pair of input electrodes, which may be formed of silver and baked thereon, wherein one of said pair of input electrodes is mounted on each major surface of said transducer means 40. Although it has been stated that the transducer means 40 may be formed of a ferroelectric ceramic, it should be manifest that said transducer means 40 may comprise piezoelectric, electrostatic or any other of the well-known class of materials which will transduce electrical signals applied thereto into mechanical forces. The transducer means 40 is then affixed to the surface of the circular disc resonator means 40 with a suitable degree of eccentricity, as illustrated, so that when said transducer means 40 is energized by electrical signals applied thereto, the mechanical forces generated by said transducer 40 will induce the flexural modes of vibration in the circular disc resonator means 38 described in conjunction with FIGS. 2*a* and 2*b*. By properly determining the eccentricity, the two modes of vibration illustrated in FIGS. 2*a* and 2*b* may be induced in said circular disc resonator means 38 with approximately equal intensities. As one of the input electrodes of said transducer means 40 is placed in contact with said circular disc resonator means 38, when the former is eccentrically affixed to the latter, a pair of input terminal means 42 may be provided for the electromechanical transducer means 20, by connecting one of said terminal means 42 to the exposed input electrode on the exposed surface of said transducer means 40 while the other one of said pair of input terminal means 42 may be connected directly to said circular disc resonator means 38 in contact with the other surface of said transducer means 40.

The plurality of first coupling means 22 and 24 are connected to a vibrating surface of the circular disc resonator means 38 such that said plurality of first coupling means 22 and 24 are in mechanical communication therewith and hence receive the flexural vibrations present in said circular disc resonator means 38. The first plurality of coupling means 22 and 24 may be formed of the same material as the circular disc resonator means 38 and serve to couple the flexural vibrations present in said circular disc resonator means 38, as received thereby, to the plurality of resonator means 26 and 28, respectively, connected thereto in the form of longitudinal mechanical vibrations. As the electromechanical frequency band separation apparatus depicted in FIG. 1 constitutes a bifurcated structure operating in conjunction with electromechanical transducer means having two modes of vibration, one of said plurality of resonator means 26 or 28 is designed to have a resonant vibration frequency equal to one of the frequencies of modes of flexural vibration exhibited by the circular disc resonator means 38 while the other of said plurality of resonator means 26 or 28 is designed to have a resonant vibration frequency equal to the other of the frequencies of the modes of flexural vibration exhibited by such circular disc resonator means 38. In addition, the plurality of resonator means 26 or 28 are adapted to vibrate longitudinally in response to the longitudinal mechanical vibrations supplied thereto by said first plurality of coupling means 22 and 24, respectively, although said resonator means 26 or 28 could alternatively be adapted to vibrate flexurally or torsionally. The plurality of resonator means 26 or 28 may again be formed of the same material as the circular disc resonator means 38 or other suitable materials may be used therefor.

The second plurality of coupling means 30 and 32 are connected to the plurality of resonator means 26 and 28, respectively, and in addition thereto are in mechanical communication with the plurality of side transducer means 34 and 36, respectively. The plurality of second coupling means 30 and 32 may be formed of the same material as the plurality of first coupling means 22 and 24 or other suitable materials may be utilized therefor. The function of the plurality of second coupling means 30 and 32 is to transmit the longitudinal vibrations of said plurality of resonator means 26 and 28 respectively to the plurality side transducer means 34 and 36 respectively coupled thereto.

Each of the plurality of side transducer means 34 and 36 comprises two circular segments 39 and 41 or 43 and 45 respectively, which may be formed of an iron nick alloy, or suitable other materials such as those mentioned above, and a thin disc 46 or 48, respectively, formed of poled ferroelectric material, or suitable other electrochemical transducing material. The plurality of side transducer means 34 and 36 act in the well-known manner to transduce mechanical vibrations applied thereto via the plurality of second coupling means 30 and 32 into electrical signals representative thereof. Such electrical signals are thus provided at the pairs of output terminal means 50 and 52 connected to each of said plurality of side transducer means 34 and 36. The plurality of side tranducer means 34 and 36 are designed for resonance at the same vibration frequency as the resonator means 26 and 28 respectively connected thereto by said plurality of second coupling means 30 and 32, respectively. Thus, it will be apparent that in the bifurcated structure depicted in FIG. 3, the resonant frequencies of the resonator means 26 and the side transducer means 34 may be designed to be substantially equal to the flexural vibration frequency of the nodal single circle vibration mode shown in FIG. 2*a*, while the resonant frequencies of the resonator 28 and the side transducer means 36 may be designed to be substantially equal to the flexural vibration frequncy of the two-diameter nodal lines shown in FIG. 2*b*. Accordingly, it is seen that two frequency selective mechanical branches are formed in the embodiment of the invention depicted in FIG. 3, whose passbands, as determined by said circular disc resonator means 38 and one of said plurality of resonator means 26 or 28, are respectively equal in frequency to the frequency of the two flexural modes of vibration established in the electromechanical transducer means 20.

In the operation of the embodiment of the electromechanical frequency band separation apparatus illustrated in FIG. 3, electrical input signals having a relatively wide frequency range are applied to the pair of input terminal means 42 affixed to the main electromechanical transducer means 20. The electrical input signals applied to the pair of input terminal means 42 are transduced, in the well-known manner, into mechanical forces by the transducer means 40 affixed eccentrically to a surface of the circular disc resonator means 38 and mechanical forces thereby transmitted to the circular disc resonator means 38 will induce vibrations therein in both the single circle flexural mode depicted in FIG. 2*a* and the two diameter flexural mode depicted in FIG. 2*b*. As mentioned above, when the degree of eccentricity of the mounting of the transducer 40 is appropriate, the intensity of the vibrations induced in each mode will be substantially equal whereby the integrity of the frequency spectrum of the input electrical signals will be maintained despite their separation into the two modes of flexural vibration. Furthermore, although the mechanical impedance of the main transducer 20, as seen from a coupling point may appear subject to change due to the orientation at which the two-diameter nodal lines occur, in actuality, this is not a problem because the orientation with respect to a given reference line is essentially determined by such factors as the degree of eccentricity and the manner in which the resonator systems are coupled to the main transduced.

The two modes of flexural vibrations thereby induced in said circular disc resonator means 38 will be applied to the plurality of first coupling means 22 and 24 which are adapted to transform flexural vibrations into longitudinal vibrations of the same frequency, and thereafter to the plurality of resonator means 26 and 28. As aforesaid, since one of the plurality of resonator means 26 or 28 has been designed to resonate at the frequency of one of the two modes of vibration of the circular disc resonator means 38, while the other one of said plurality of resonator means 26 or 28 has been designed to resonate at the frequency of the other mode of vibration of the circular disc resonator means 38; each of said plurality of resonator means 26 and 28 will be driven into resonant vibration by the longitudinal vibrations present in the plurality of first coupling means 22 and 24, respectively. Thus, under the conditions specified above with regard to the FIG. 3 embodiment, the resonator means 26 will be driven into longitudinal vibrations at its resonance frequency, which is equal to the flexural vibration frequency of the nodal single cycle mode of vibration of the circular disc resonator means 38, as shown in FIG. 2*a*, while the resonator means 28 will be driven into longitudinal vibrations at its resonance frequency, which is equal to the flexural vibration frequency of the two-diameter nodal lines mode of vibration of the circular disc means 38, as shown in FIG. 2*b*. Accordingly, it will be seen that in the exemplary embodiment of the invention depicted in FIG.3, the frequency components present in the electrical input signals applied to the pair of input terminals 42 are effectively separated between the two frequency selective mechanical branches formed by the bifurcated structure thereof in a manner determined by the first and second modes of vibration of the circular disc resonator means 38 and the resonant frequency of vibration or the passband of the resonator means 26 or 28 present in each of said frequency selective mechanical branches.

The longitudinal, resonant vibrations of each of said plurality of resonator means 26 or 28 are transmitted over the respective one of the plurality of second coupling means 30 or 32, connected thereto, to one of the plurality of side transducer means 34 or 36, respectively. The plurality of side transducer means 34 and 36, which are designed, as aforesaid, for resonance at the same frequency as the respective resonator means 26 or 28 coupled thereto, act in the well-known manner to transduce the longitudinal vibrations coupled thereto, over the plurality of second coupling means 30 or 32, into electrical signals representative of such vibrations whereupon such representative electrical signals are available at the output terminal means 50 and 52, respectively. Therefore, the frequency components present in the electrical input signals applied to the pair of input terminals 42, as separated among the two frequency selective, mechanical branches formed by the bifurcated structure of the FIG. 3 embodiment, in the manner determined by the two vibration modes of the circular disc resonator means 38 of the electromechanical transducer means 20 and the passbands of the resonator means 26 and 28, are made available in the form of electrical signals of the requisite frequency at the output terminal means 50 and 52, respectively. Accordingly, it will be seen that the multimode vibrations of a single main transducer means has been utilized in a multifurcated structure to provide electromechanical frequency band separation apparatus having a relatively wide passband separation between adjacent channels.

Although the embodiments of the inventive subject matter disclosed herein have been set forth in the form of frequency band separation apparatus, since the multifurcated mechanical structure is both initiated and terminated by electromechanical transducer devices which may operate in either direction, as will be apparent to those of ordinary skill in the art, the operational characteristics of the subject apparatus are readily reversible wherein the input and output terminals thereto may be reversed whereby the disclosed invention will act as frequency combining apparatus. Thus, the apparatus contemplated by this invention is bilateral as well as being linear such that both superposition and reciprocity principles will hold therefor in much the same manner as in purely electrical frequency band separation apparatus.

Furthermore, although the illustrated structure of the specific embodiment of this invention was disclosed wherein the non-transducer portions thereof were formed of different materials from the transducer portions, it should be understood that the entire apparatus may be formed of a suitable, poled ferroelectric ceramic having appropriately positioned electrode pairs incorporated therein. In addition, as will be readily apparent to those of ordinary skill in the art, the various component portions of the embodiment of this invention disclosed in FIG. 3 may take other geometric shapes than those depicted in FIG. 3 and the appropriate materials usable therefor can vary over a wide range. Thus, the transducer portions may be made of a single piezoelectric crystal, such as quartz crystal, rather than a poled ferroelectric ceramic and/or the coupled resonator means may comprise a plurality of resonating means coupled successively with suitable interconnecting means therebetween to thereby facilitate sharper passband characteristics. Further, in this regard, although the specific embodiment of this invention depicted in FIG. 3 utilized a flexural-longitudinal-longitudinal mode of vibration transmission, any combination of flexural, longitudinal and/or torsional modes of vibration may be used for the transfer of mechanical energy and this specifically includes the form of vibrations initially induced in the main electromechanical transducer means. Accordingly, the multimode vibrations may be composed of two different forms of vibration modes such as longitudinal and flexural whereby certain of the frequency selective, mechanical branches would be responsive to one form of vibration while the other of said branches would be responsive to the other forms of vibration.

While the invention has been described in connection with two exemplary embodiments thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

What is claimed is:

1. Electromechanical frequency band separation apparatus comprising:

- main electromechanical transducer means adapted to receive electrical input signals having a wide frequency bandwidth, said main electromechanical transducer means taking the form of transducer means mechanically coupled to resonating means, said resonating means being configurated to exhibit a plurality of distinct modes of vibration rendering the electromechanical transducer means formed responsive to said electrical input signals to produce multimode mechanical vibrations;
- a plurality of resonator means, said plurality of resonator means including at least one resonator means for each of several desired modes of vibration produced by said main electromechanical transducer means when said main electromechanical transducer means is in receipt of electrical input signals;
- first coupling means mechanically interposed between said main electromechanical transducer means and each of said plurality of resonator means, said first coupling means adapted to transmit vibrations to said plurality of resonator means at frequencies representative of the modes of vibration of said main electromechanical transducer means;
- a plurality of side transducer means adapted to produce electrical output signals in response to mechanical input signals applied thereto, said plurality of side transducer means being at least equal in number to said plurality of resonator means; and
- a plurality of second coupling means for transmitting mechanical vibrations applied thereto, one of said plurality of second coupling means being mechanically interposed between each of said plurality of resonator means and corresponding ones of said plurality of side transducer means whereby each of said resonator means in combination with said transducer means coupled thereto constitutes a frequency selective branch of said main electromechanical frequency band separation apparatus.

2. The apparatus of claim 1 wherein said main electromechanical transducer means and said plurality of side transducer means comprise reversible energy conversion means whereby said electromechanical frequency band separation apparatus acts as a bilateral network.

3. The apparatus of claim 1 wherein each of said plurality of resonator means is designed to resonate at a select frequency.

4. The apparatus of claim 3 wherein each select frequency is substantially equal to a multiple of the frequency of one of them odes of vibration of said main electromechanical transducer means.

5. The apparatus of claim 4 wherein said plurality of resonator means includes at least one resonator means designed to resonate at a select frequency substantially equal to the frequency of vibration of each mode of vibration of said main electromechanical transducer means.

6. The apparatus of claim 5 wherein said resonating means comprises a circular disc resonator having a plurality of flexural modes of vibration.

7. The apparatus of claim 6 wherein said corresponding ones of said side transducer means are adapted to resonate at substantially the same frequency as said resonator means coupled thereto by the respective ones of said plurality of second coupling means.

8. The apparatus of claim 7 wherein said plurality of resonator means are adapted to vibrate in a longitudinal mode of vibration.

9. The apparatus of claim 8 wherein said first coupling means are adapted to vibrate in a longitudinal mode of vibration.

10. The apparatus of claim 9 wherein said first coupling means comprise a plurality of individual coupling means equal in number to said plurality of resonator means.

11. The apparatus of claim 10 wherein said main electromechanical transducer means and said plurality of side transducer means comprise reversible energy conversion means whereby said electromechanical frequency band separation apparatus acts as a bilateral network.

12. The apparatus of claim 11 wherein said bilateral network is substantially linear and comprises a multifurcated structure having a plurality of frequency selective mechanical branches.

13. The apparatus of claim 12 wherein said electromechanical frequency band separation apparatus comprises a bifurcated structure having two resonator means and said electromechanical transducer means exhibits two modes of vibration.

14. The apparatus according to claim 13 wherein said transducer means present in said main electromechanical transducer means is eccentrically positioned on said resonating means so that vibrations received and transmitted by each of said first coupling means are substantially equal in intensity.

References Cited

UNITED STATES PATENTS

| | | | |
|---|---|---|---|
| 2,955,267 | 10/1960 | Mason | 333—71 |
| 3,253,166 | 5/1966 | Osial et al. | 310—8.2 |
| 3,317,858 | 5/1967 | Tagawa | 333—6 |

PAUL L. GENSLER, Primary Examiner

U.S. Cl. X.R.

333—71, 72